United States Patent [19]
Miller

[11] 4,255,388
[45] Mar. 10, 1981

[54] APPARATUS FOR THE PRODUCTION OF $H_2S$ FROM $SO_2$ OBTAINED FROM FLUE GAS

[75] Inventor: Ralph Miller, Pleasantville, N.Y.

[73] Assignee: DTPM Corporation, Maple Row, N.Y.

[21] Appl. No.: 960,929

[22] Filed: Nov. 15, 1978

Related U.S. Application Data

[62] Division of Ser. No. 807,044, Jun. 16, 1977, Pat. No. 4,141,961.

[51] Int. Cl.³ .................. B01D 53/34; C01B 17/16
[52] U.S. Cl. .................................. 422/168; 422/189; 422/209; 423/242; 423/563
[58] Field of Search ............ 423/242 A, 561, 563, 423/566, 512 A, 564, 193; 422/168, 169, 187, 189, 209

[56] References Cited
U.S. PATENT DOCUMENTS

| | | | |
|---|---|---|---|
| 2,936,220 | 5/1960 | Bill et al. | 422/209 X |
| 3,519,815 | 7/1970 | Sandbrook | 422/209 X |
| 3,832,444 | 8/1974 | Doyle | 423/512 A X |
| 3,932,587 | 1/1976 | Grantham et al. | 423/242 A |
| 3,961,021 | 6/1976 | Morita et al. | 423/242 A |
| 3,972,980 | 8/1976 | Lowell | 423/242 A |
| 4,079,119 | 3/1978 | Nicholson et al. | 423/242 A |

*Primary Examiner*—Arnold Turk
*Attorney, Agent, or Firm*—Pennie & Edmonds

[57] ABSTRACT

This invention is an apparatus and a process for producing gaseous hydrogen sulfide in concentrated form from sulfur dioxide obtained from a dilute gas source by (1) reacting the $SO_2$ with $Na_2CO_3$ to form $Na_2SO_3$, (2) reducing the $Na_2SO_3$ to $Na_2S$, (3) reacting the $Na_2S$ with $NaHCO_3$ to form $H_2S$ and $Na_2Co_3$, (4) recycling part of the $Na_2CO_3$ to the $SO_2$ reaction step, (5) reacting the remainder of the $Na_2CO_3$ with $CO_2$ and $H_2O$ to form $NaHCO_3$ and (6) recycling the $NaHCO_3$ to the $H_2S$ formation reaction.

8 Claims, 1 Drawing Figure

APPARATUS FOR THE PRODUCTION OF H₂S FROM SO₂ OBTAINED FROM FLUE GAS

This is a division of application serial No. 807,044 filed June 16, 1977, now U.S. Pat. No. 4,141,961, issued Feb. 27, 1979.

This invention is concerned with the economic conversion of sulfur dioxide initially contained in a gas mixture in which the SO₂ was a very minor component to gaseous hydrogen sulfide as a major component in a gas mixture. Although this invention is useful in a variety of circumstances, it is of especial utility in flue gas desulfurization—FGD.

It has long been known that when present in the atmosphere even in small concentrations, sulfur dioxide is detrimental to the well-being of animal, aquatic and plant life. When converted to sulfuric acid by the oxygen and moisture in the air, which conversion takes place readily, sulfur dioxide is responsible for the corrosion of many materials of construction including steel and concrete.

Putting large amounts of SO₂ into the air from fuel burning installations was prohibited in 1967. In that year Congress passed the Clean Air Act and amended it in 1970. As a result of this legislation the Environmental Protection Agency -EPA- has established standards which limits the emission of the principal pollutants contained an flue gas. These pollutants are particulates, sulfur dioxide and nitrogen oxides measured as nitrogen dioxide. Some of these standards are shown in Table I.

TABLE I

Standards of Performance for New Fossil-Fired Steam Generators
(Construction Commenced After August 17, 1971)

| Fuel Type | Maximum Quantity of Pollutants Permitted in Flue Gas Pounds/Million BTU | | |
|---|---|---|---|
| | Particulates | Sulfur Oxides | Nitrogen Oxides |
| Solid | .10 | 1.2 | .70 |
| Liquid | .10 | .8 | .30 |
| Gas | — | — | .20 |

The bulk of our heavy duty fuels i.e. bituminous coal and residual fuel oil contain appreciable percentages of sulfur—many containing more than 3% by weight. From the above figures it is evident that when 12,000 BTU per pound coal containing 0.8% sulfur is burned, the limits set by the EPA will be exceeded. To operate within EPA limits installations burning large tonnages of economically priced fuel have had to resort to scrubbers to remove a large part of the SO₂ contained in the flue gas leaving their combustion zones. Most of these scrubbers use lime or limestone directly or indirectly to combine with the SO₂ scrubbed out of the flue gas. The chief virtue of this practice is that the pollutant formed, a sludge composed mainly of calcium sulfite and calcium sulfate, is less objectionable than SO₂ in air. These sludges are being impounded except where local circumstances allow them to be used as land-fill.

Far seeing people recognized a long time ago that the spewing forth into the atmosphere of large amounts of sulfur dioxide would some day be prohibited in the U.S.A. It has been prohibited in some parts of the world for many years. As long ago as 1930, SO₂ was being scrubbed out of flue gas using limestone slurries. Studies to solve this problem were initiated as long ago as 1935 in the U.S.A. The results of these efforts are described in a paper by Johnstone and Singh which appeared in Industrial and Engineering Chemistry Vol. 32, No. 8 pages 1037-1049. A brief summary of the overall status of FGD in the U.S.A. is contained in an article that appeared in the May 23, 1977 issue of Chemical Engineering pages 101-103. Of the processses mentioned, that closest to the process which constitutes this invention is the so-called Aqueous Carbonate Process (ACP). It is described more fully in Volume II of the Proceedings: Symposium on Flue Gas Desulfurization, New Orleans, March 1976 pages 788-816 [Environmental Protection Technology Series].

Most fuels, solid and liquid, contain small amounts of nitrogen-containing compounds. When these fuels are burned, the nitrogen appears in the flue gas principally as nitrogen oxide—NO. In addition, at the high temperatures reached in many boilers, small amounts of NO are formed from nitrogen and oxygen in accordance with the overall reaction:

$$N_2 + O_2 = 2NO.$$

It would be highly desirable to be able to use a scrubbing system which will scrub out the oxides of nitrogen as well as the SO₂. It is much easier to scrub NO₂ out of a gas stream with an aqueous scrub liquor than NO. Although the reaction is relatively slow, at moderate temperature NO and oxygen combine to form NO₂. The reaction is $$2NO + O_2 = 2NO_2$$

In the preferred method of using this invention much of the NO in the flue gas has the opportunity to be converted to NO₂. Fortuitously, the scrub liquor used in this invention to scrub out SO₂ is also an effective NO₂ absorbent.

The manner in which the flue gas is contacted by the absorbent for SO₂ is such that the bulk of any particulates suspended in the flue gas will be captured by the scrub slurry. Consequently, nearly all of the pollutants contained in a flue gas will be removed by the scrubbing step of this invention.

Many of the absorbents used to scrub SO₂ out of flue gas form slightly soluble compounds. As a result, the equipment used to effect the contact between gas and absorbent becomes covered with scale. The scale formed causes operational difficulties necessitating shutdowns and the incurring of excessive maintenance costs.

When SO₂ is scrubbed out of flue gas by calcium compounds, either directly or indirectly, the resulting substance becomes a waste disposal problem.

It is an object of this invention to scrub SO₂ out of flue gas by means of an absorbent slurry which contains a suspended soluble sulfite salt so that the SO₂ which is absorbed and then crystallizes, comes out of solution preferentially on the suspended salt particles so that scaling of the scrubbing equipment is minimized.

A further object of this invention is to convert the SO₂ scrubbed out of a dilute gaseous mixture to hydrogen sulfide as a major component of a gas mixture so that the hydrogen sulfide can be economically converted to an article of commerce such as liquid hydrogen sulfide, elemental sulfur, sulfuric acid etc. thereby eliminating waste disposal problems.

It is a further object of this invention to scrub SO₂ out of a flue gas with an absorbent which has both a strong affinity for sulfur dioxide and is completely regenerable by carrying out the subsequent steps of the process.

It is a further object of this invention to scrub $SO_2$ out of a flue gas by means of an absorbent which is completely regenerable even though a significant fraction of the sulfite is oxidized to sulfate during the time the scrub solution is in the scrubbing zone.

It is a further object of this invention to use an absorbent slurry to scrub $SO_2$ out of flue gas whose ability to absorb $SO_2$ is undiminished as the slurry flows through the scrubbing zone.

It is a further object of the invention to use an absorbent slurry to scrub $SO_2$ out of flue gas which is operable over a wide temperature range.

The above objects and others which will be evident from the following description are attained by employing a series of well-known chemical reactions in a novel sequence.

SUMMARY OF THE INVENTION

The reactions which are employed in the process consist of:

Absorbing $SO_2$ in a solution which is saturated with sodium sulfite and preferably also contains dissolved sodium carbonate. The fundamental reaction in the absorption step is:

$$SO_2 + Na_2CO_3 = CO_2 + Na_2SO_3$$

This reaction takes place when the solution in the absorption zone contains some dissolved sodium carbonate.

If no sodium carbonate is present, $SO_2$ is absorbed using dissolved sodium sulfite as the absorbent. The reaction being:

$$Na_2SO_3 + H_2O + SO_2 = NaHSO_3$$

The ability of the absorbent to continue to absorb $SO_2$ is maintained by the subsequent addition of sodium carbonate. The sodium bisulfite reacts with the carbonate as follows:

$$2NaHSO_3 + Na_2CO_3 = CO_2 + 2Na_2SO_3 + H_2O$$

An undesirable reaction but one with which the process can cope is the oxidation of part of the sulfite to sulfate:

$$Na_2SO_3 + \tfrac{1}{2}O_2(Air) = Na_2SO_4$$

The second series of reactions of the process involve the reduction of the sodium sulfite and sodium sulfate to sodium sulfide by means of a readily available reducing agent. In most instances this will be bituminous coal but other inexpensive reductants such as coke, or wood, or heavy oil also work satisfactorily. The overall reactions can be written:

$$2Na_2SO_3 + 3C = 2Na_2S + 3CO_2$$

$$Na_2SO_4 + 2C = Na_2S + 2CO_2$$

If sodium nitrate is present it is converted to sodium carbonate and nitrogen. The overall reaction is:

$$4NaNO_3 + 3C = 2Na_2COnhd\ 3 + 2N_2 + 3CO_2$$

The principal reaction following the reduction reactions is the generation of hydrogen sulfide from sodium sulfide and sodium bicarbonate. The overall reaction is:

$$Na_2S + 2NaHCO_3 = H_2S + 2Na_2CO_3$$

It will be noted that the sequence of the reduction reactions followed by the $H_2S$ generation step results in the regeneration of the sodium carbonate used in the $SO_2$ absorption step.

The final step of the process is the well-known bicarbonate of soda formation reaction:

$$Na_2CO_3 + H_2O + CO_2 = 2NaHCO_3$$

Any convenient, low cost source of $CO_2$ can be used such as the gas resulting from the reducing step or the $SO_2$-free flue gas.

In most instances the final reaction will be the conversion of the $H_2S$ to sulfur using the classical Claus process; the fundamental overall reaction being:

$$2H_2S + O_2\ (Air) = 2H_2O + 2S$$

The relationship of the principal individual reactions to each other are:

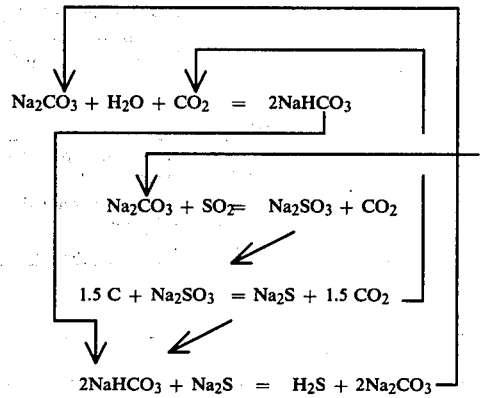

BRIEF DESCRIPTION OF THE DRAWING

FIG. I is a flow diagram depicting the relationship of the various steps to each other when the invention is practiced at a site where space is available for all the necessary equipment and the $SO_2$—containing flue gas is washed with water to remove particulates prior to the $SO_2$ removal step. Under less preferable conditions certain steps of the process can be physically separated. Although not desirable, in some instances it is necessary to carry out certain steps of the process at two different locations. One of the advantages of the invention is that a split operation is technically feasible. This mode of operation is employed when it provides economic advantages compared with the use of any other process for freeing flue gas from pollutants prior to venting it to the atmosphere.

DETAILED DESCRIPTION

Figure 1:
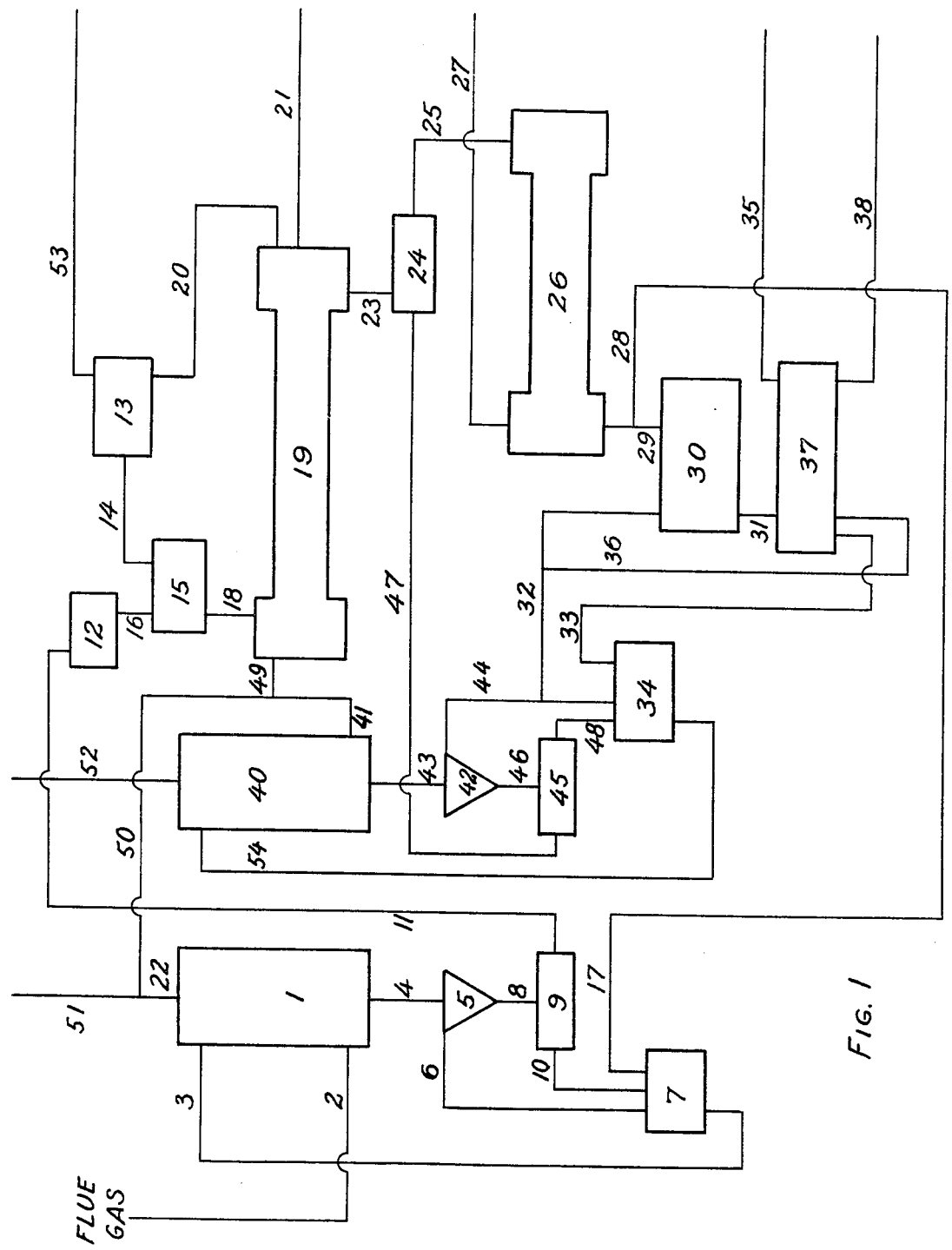

The invention can be understood by following each step starting with the sulfur compound as it enters the process as sulfur dioxide and finally leaves as gaseous hydrogen sulfide in concentrated form. The $SO_2$-containing flue gas is scrubbed with water by means not shown to remove the bulk of the particulate solids. By referring to FIG. I it will be noted that the gas then flows into the lower gas inlet of a first absorption zone (1) by means of duct (2). In this zone the gas is contacted by an aqueous slurry, the liquid phase of which is an aqueous solution containing mostly dissolved sodium sulfite and sodium sulfate, minor amounts of other sodium salts e.g. sodium nitrate, plus a small amount of sodium carbonate. The solid phase is essentially mixed crystals of sodium sulfite and sodium sulfate—the bulk of the solids being composed of sodium sulfite. The temperature of the scrubbing step is controlled so that the anhydrous salt crystallizes i.e. the temperature is maintained at such a temperature that the solid salts which precipitate are free from water of crystallization. A suitable temperature range is between 40° C. and 50° C. The purpose of maintaining the scrubbing solution at the indicated temperature is to minimize the fuel cost in a subsequent step of the process. It does not affect the ability of the solution to absorb $SO_2$ or oxides of nitrogen. The undesirable oxidation of sulfite to sulfate takes place primarily in this first absorption zone.

Its extent depends upon many factors such as the amount of excess air in the flue gas, the presence of trace amounts of dissolved catalytic metals such as iron and copper, temperature etc. When appreciable concentrations of sodium sulfite and sodium sulfate are in a solution and the solution becomes saturated so that precipitation takes place, the crystals that form are mixed crystals of sodium sulfite and the sulfate. Because the absorption solution is saturated with sodium sulfite, its ability to dissolve oxygen is limited. This diminishes the degree to which the oxidation reaction takes place compared to the degree to which it takes place when less concentrated sulfite scrubbing solutions are employed.

Because of the properties of the absorbent slurry, the solids in the slurry always contain some sodium sulfate mixed with the sodium sulfite. Whenever solid sulfite is mentioned below it must be understood that it will be mixed with some sodium sulfate. Similarly, it should be understood that the liquid phase of the absorbent slurry will always contain some dissolved sodium sulfate but the predominant solute will be sodium sulfite.

The oxides of nitrogen in the flue gas are also absorbed in this first absorption zone to a greater or lesser degree depending upon the amount of NO and $NO_2$ present. If there are equimolar concentrations, most of oxides will be absorbed and form sodium nitrite. An excess of nitrogen dioxide results in the formation of sodium nitrate as well. As is known, NO in the presence of air is absorbed by aqueous alkaline solutions containing dissolved sulfite, but the absorption takes place more slowly than the absorption nitrogen dioxide. Since oxides of nitrogen are always present in flue gas containing an appreciable concentration of $SO_2$, the liquid portion of the absorbent slurry always contains some sodium nitrite and sodium nitrate. As a result of the subsequent steps of the process these oxides of nitrogen are eventually converted to nitrogen and vented to the atmosphere without having to take any special steps to accomplish this objective.

To maintain the solution's ability to absorb $SO_2$ and to form anhydrous sodium sulfite crystals from the absorbed $SO_2$, the solution is fortified by the continous or periodic addition of sodium carbonate the source of which is described below.

The slurry used to contact the $SO_2$-containing gas in the first absorption zone enters it at one end through pipe 3 by means of a pump not shown. The slurry flows through the zone counter-current to the $SO_2$-containing gas flowing in the opposite direction. The $SO_2$ is absorbed by the liquid phase of the slurry as the gas and slurry are intimately contacted. The $SO_2$-free gas leaves the zone through vent pipe 22. As the $SO_2$ is absorbed additional solid sodium sulfite forms since the solution is maintained in a saturated condition. The slurry leaves the first absorption zone by means of outlet pipe 4 which conducts it into a settler 5. The larger crystals in the slurry sink to the lower section of the settler and form a more dense magma. The smaller crystals and the bulk of the liquid phase leave the settler through overflow line 6 through which it empties into surge tank 7. The magma formed in the base of the settler leaves through its bottom outlet and flows by means of pipe 8 into centrifuge 9. In centrifuge 9 most of the solids are separated from their accompanying liquid phase. The liquid phase is directed to surge tank 7 by means of pipe 10. Crude sodium carbonate is also fed to surge tank 7 by means of belt 17. The mixture formed in tank 7 is circulated through the absorption zone 1 by means of the pump, not shown, mentioned previously.

The moist solids separated in centrifuge 9 are conveyed by belt 11 into feed hopper 12. By means of screw conveyor 53 from a source not shown, feed hopper 13 is periodically replenished with pulverized bituminous coal. Pulverized coal is removed from hopper 13 by means of screw conveyor 14 and fed to mixer 15. Crude moist sodium sulfite is withdrawn from feed hopper 12 by means of feeder 16 and also fed to mixer 15. Crude moist sodium sulfite and coal are intimately mixed in mixer 15 and the mixture fed by means of screw conveyor 18 into the fed end of direct fired rotary kiln 19. By means of screw feeder 20 pulverized coal from hopper 13 and combustion air from line 21 are fed to the kiln's discharge end 19. The coal is burned with essentially the stoichiometric amount of oxygen so that the gaseous atmosphere within the kiln is reducing rather than oxidizing. As the mixture of coal and sodium sulfite moves through the kiln counter-current to the hot products combustion, the sodium sulfite is reduced to sodium sulfide and the carbon is oxidized to carbon dioxide.

Althouth not essential it is desirable to use such a ratio of sodium sulfite to coal, approximately 4 to 1, that the bulk of the sodium is converted to the sulfide. It is preferable to control the temperature so that little or none of the mixture within the kiln reaches its melting point. By operating under these conditions, solid particles, mostly sodium sulfide, flow out of the discharge end of the kiln. By having a maximum temperature in the kiln within the range 650° C. to 750° C., the salt mixture does not soften. By insuring excess carbon in the mixture leaving the kiln, more than 90% of the sodium sulfite is converted to sodium sulfide.

The solid mixture formed in the rotary kiln is withdrawn through the kiln's discharge outlet by means of screw conveyor 23 equipped with means, not shown, to prevent air from contacting the hot solid sodium sulfide-containing mixture. Screw conveyor 23 delivers the sodium sulfide-containing mixture to continuous mixer-grinder 24 in which it is blended with the stoichiometric quantity of moist sodium bicarbonate the source of which is described below. The mixer-grinder converts the mixture into small particles thoroughly commingled. Mixer-grinder 24 is equipped with seals to prevent the escape of any vapors formed during the blending operation. To insure that vapors do not escape mixer-grinder 24 is maintained under a slight negative pressure.

The mixture resulting from the blending of the bicarbonate and sodium sulfide-containing solid flows out of the mixer-grinder's outlet into screw conveyor 25 which delivers it to steam tube rotary calciner 26. The steam tube calciner is heated by high pressure steam e.g. steam at a pressure between 400 and 450 psi.

In the calciner the bulk of the sodium bicarbonate and the bulk of the sodium sulfide are heated to a temperature of about 200° C. Under these conditions they react to form crude sodium carbonate and gaseous hydrogen sulfide. The water in the mixture fed to the calciner is also vaporized. The water vapor and gaseous hydrogen sulfide leave the calciner's gas outlet and by means of pipe 27 are conveyed to a condenser, not shown, in which the bulk of the water vapor is separated from the $H_2S$ and the separated $H_2S$ converted to sulfur in a Claus process plant not shown.

The crude sodium carbonate-containing solid formed in the calciner leaves the calciner's discharge outlet and by means of screw conveyers 28 and 29, crude sodium carbonate is fed respectively to surge tank 7 via belt 17, and dissolver 30. Sodium bicarbonate-containing solution whose source is described below is also fed to dissolver 30 by means of line 32. The slurry formed in dissolver 30 is piped via pipe 31 to filter 37. The concentrated filtrate separated from the solids by means of filter 37 is pumped by a pump, not shown, through line 33 into surge tank 34. Wash water is introduced to the washing section of filter 37 by means of water feed line 35. The wash liquor containing the remaining water soluble components of the mixture entering dissolver 30 flows out of filter 37 and by means of line 36 is directed to dissolver 30 via pipe 32. The washed solids, free from water soluble components, leaves filter 37 and by means of screw conveyor 38 is mixed with the fuel fed to the boiler, not shown, in which the sulfur dioxide-containing products of combustion are formed.

The solution and suspended solids contained in surge tank 34 which consists in large part of a mixture of sodium bicarbonate and sodium carbonate is circulated by means of pipe 54 to the liquid inlet of a second absorption zone 40. Carbon dioxide-containing gas is fed to inlet of absorption zone 40 by means of pipe line 41. The source of the carbon dioxide gas is described below. In this absorption zone 40 carbon dioxide is absorbed by the sodium carbonate-containing solution which is maintained saturated with sodium bicarbonate. As a result of the absorption of the carbon dioxide, sodium carbonate is converted to sodium bicarbonate which crystallizes from solution. The slurry leaving absorption zone 40 is directed into settler 42 by means of line 43. The larger particles of solid sodium bicarbonate in the slurry settle into the lower section of settler 42. The smaller particles and the bulk of the solution leave the settler from its top outlet and by means of pipe 44 is delivered to surge tank 34. The magma formed in the lower section of settler 42 is fed to centrifuge 45 by means of pipe 46. Centrifuge 45 separates the slurry feed into two fractions one of which is the centrifuge cake consisting in large part of moist sodium bicarbonate and the other consisting of the bulk of the solution contained in the slurry. The moist sodium bicarbonate cake is transported by belt conveyor 47 to mixer-grinder 24.

The solution leaving the centriguge flows by means of pipe 48 into surge tank 34.

The carbon dioxide fed to absorption zone 40 is preferably obtained from the exhaust gas from kiln 19 by means of duct 49 via pipe 41. Should this gas be unavailable as a result of local conditions or should the quantity of $CO_2$ be insufficient for any reason, then carbon dioxide can be obtained from the gas leaving absorption zone 1. When $CO_2$ is fed to absorption zone 40 from the gas leaving absorption zone 1, it is piped from vent pipe 22 by means of pipeline 50 into pipe 41 which leads to absorption zone 40. Carbon dioxide-containing gas exiting from absorption zone 1, not needed for absorption in zone 40, is vented to the atmosphere by means of vent pipe 51. No matter the source of the carbon dioxide entering absorption zone 40, the $CO_2$ will be mixed with a preponderance of nitrogen. The nitrogen plus all of the remaining unabsorbed gas leaves zone 40 by means of vent pipe 52.

Many variations can be employed of each of the steps described above. This process has a large number of unobvious advantages.

Mention has been made of the desirability of removing the particulates from the $SO_2$-containing gas prior to its treatment by this process. Although this is desirable, the process of this invention can be carried out successfully even though particulates are present. Most of the particulates that are borne along by the $SO_2$-containing gas will be scrubbed out by the scrubbing liquid. These solids will leave the scrubbing system eventually along with the solid sodium sulfite.

By using a soluble slurry absorbent, i.e. an aqueous solution saturated with sodium sulfite containing suspended sodium sulfite crystals, there is little tendency for scaling to take place on the interior surfaces of the scrubber. Should scaling occur, the soluble sulfite will quickly redissolve by manipulating the sodium sulfite concentration of the scrub liquor.

If desirable, hydroclones can be used instead of settlers. Similarly, filters can be used instead of centrifuges.

Although it is preferred to reduce the sodium sulfite with coal without allowing the reaction mixture to melt, this is not essential. By carrying out the reduction at a temperature high enough to maintain the bulk of the sodium sulfide in a molten state, the reduction reaction is speeded up. However, this means a more expensive refractory will be required to line the inner surface of the container in which the reduction is carried out. Moreover, the molten product must be solidified by cooling in an inert atmosphere to minimize reoxidation prior to mixing with the moist sodium bicarbonate.

In carrying out the reduction step, it is desirable to use an excess of reducing agent. The unreacted reducing agent plus the ash from the coal which has reacted plus the ash left as a result of burning the coal will be mixed with the sodium carbonate formed in the steam tube rotary calciner. To rid the system of the ash and to recover the fuel value left in the filter cake, the filter cake is mixed with the fuel fed to the boiler. The weight of filter cake is only a small fraction of the weight of fuel. Because the weight of filter cake is so small compared with the weight of the fuel, adding the filter cake to the fuel does not affect the operation of the burner but it prevents fuel from being wasted.

This process is particularly advantageous when used to control the pollutants in the flue gas of a coal burning large steam raising installation used to generate electricity. Although various sodium salts are formed and then converted to other salts in sequence, other than coal, only utilities are consumed and they are all readily available and relatively inexpensive at such a location.

Prior to this invention, no FGD process was available which was clearly superior to limestone slurry scrubbing. As a result many limestone slurry scrubbing systems have been installed. Many of them were retrofitted to enable units constructed a long time ago to continue to operate and comply with the new regulations. Very often barely enough space was available to install the scrubbers and the auxiliary equipment required to use them.

Among the objects of this invention is the diminution of the cost of flue gas processing in older steam raising units which have already been equipped with limestone scrubbing facilities. When there is only room for the $SO_2$ scrubbing step, this is accomplished by substituting crude sodium carbonate for the ground limestone. Most of these installations have means for recirculating slurry and for separating a filter cake from a slurry. It may be ncessary to install a centrifuge to obtain a centrifuge cake with a low moisture content. This is desirable primarily to save on transportation costs.

The slurry circulated will contain suspended water soluble sodium sulfur salts and the particulates.

The moist filter cake obtained by the centrifugation operation will contain the water insoluble particulates which had been suspended in the flue gas and sodium salts i.e. sodium sulfite, sodium sulfate, along with minor amounts of sodium nitrite and sodium nitrate.

The filter cake is transported by some convenient means to a location where there is sufficient land to install the rest of the equipment required to carry out the process. Much of the equipment has already been described. Additional facilities will be needed, however. These facilities will consist primarily of a dissolver and filter with means to wash the water soluble sodium salts out of the filter cake using a minimum of water.

By conventional dissolving, evaporating, crystallizing and washing means, the insoluble particulates are separated from the mixed sodium salts. The end result consists of two filter cakes. One is composed of innocuous, water insoluble, solids essentially the ash resulting from the burning of the fuel. The other is a moist filter cake composed principally of sodium sulfite and sodium sulfate.

The sodium salt filter cake is processed as has already been described to recover the sulfur values and to regenerate sodium carbonate. Part of the crude sodium carbonate formed in the $H_2S$ formation step is shipped back to the scrubbing operation for additional $SO_2$ absorption.

It is obvious, too, that it is technically feasible to build and operate a processing facility to service the slurry resulting from two or more FGD scrubbing operations.

The use of an absorbent slurry has been emphasized above because this unobvious method results in capital investment and fuel savings. From the variation described by which particulates are separated from the soluble sodium salts, it will be noted that the invention can be carried out by absorbing $SO_2$ in an alkaline absorbent liquid whose sodium sulfite concentration is maintained below its saturation value. Sodium carbonate and water are added to the absorbent liquid to keep its composition within a narrow range. Solution containing dissolved sodium sulfite is withdrawn from the scrubbing system. Solid sodium sulfite is recovered by conventional evaporation and crystallization procedures. The recovered moist sodium sulfite filter cake is then processed as described above.

In the above description of the invention mention is made of the flue gas and absorbent slurry flowing counter-currently to each other. One aspect of this invention is the devising of an absorbent, all of whose components are substantially soluble in water which has a constant high level of $SO_2$ absorption capability. As a result the absorption medium can be used effectively in cocurrent contactors such as a venturi scrubber or in cross flow contactors.

Principal items of expense of all scrubber operations are the initial expense of the scrubbing equipment and the energy expended to achieve the necessary gas-liquid contact so that the $SO_2$ is absorbed. This energy expenditure is measured by the pressure drop required to cause the gas to flow through the scrubbing system. Anything that results in adequate $SO_2$ removal while reducing presure drop as well as capital investment provides material economic benefit. Unlike most $SO_2$ scrubbing processes, this process can be operated at a relatively high pH i.e., at a pH of 8 or higher without any appreciable penalty. This means inexpensive materials of construction can be used. In addition, it is possible to employ a well-known device to improve the absorption of a volatile acidic gas by an alkaline solution—that device is to maintain a very small concentration of ammonia in the system. This device is useful when absorbing $CO_2$ as well as $SO_2$. The $NH_3$ enters the vapor phase, reacts with the acidic gas to form a salt particle that quickly absorbs water vapor so that it is enlarged and easily wetted. The moist particle is rapidly dissolved by the scrub liquor. On dissolution, at the high pH, ammonia vaporizes and the cycle is repeated. By this means the need is eliminated for the acidic gas to diffuse through the gas-liquid interface, usually the rate controlling step in gas absorption operations. The savings in pressure drop resulting from the maintenance of a small concentration of ammonia in the scrubbing system is larger than the cost of the ammonia that has to be continously supplied.

When sodium carbonate is substituted for limestone in a scrubber already installed, the $SO_2$ absorption capacity of the system is increased. If a small ammonia concentration is maintained in the system, 1% or less, the $SO_2$ absorption capacity is further increased. By increasing the desulfurization capacity of the already installed equipment, it becomes possible to burn fuel with an increased sulfur content and still limit the $SO_2$ leaving the system to allowable quantities. Since the cost of fuel varies inversely with its sulfur content, less expensive fuel can be burned thereby providing additional substantial saving in the steam raising operation.

No part of this invention is dependent upon the particular type of equipment which has been mentioned in the above description. Any suitable slurry-gas contacting equipment can be used in the $SO_2$ and $CO_2$ absorption steps. Similarly various types of centrifuges, filter or settlers can be used to separate solids from slurries. In fact, the process has the advantage that nothing is lost when some of the solids in the slurry accompany the filtrate. This means emphasis can be placed on obtaining low water content filter cakes. It has already been pointed out that the reduction step can be carried out so that the reactants and products remain solid or at a temperature so high they melt.

When the reactants stay solid, the reduction can be carried out in a direct fired rotary kiln or a multiple hearth furnace. When the reaction is carried out at a temperature at which the sodium sulfide-containing mixture is molten, the reactor can be a refractory lined pot with means for adding the sodium salts to be reduced and the reductant. Air can be blown into the mixture to burn some of the reductant to provide the necessary heat. By providing a product outlet the whole operation can be made continuous. The reaction between sodium sulfide and sodium bicarbonate to evolve $H_2S$ and sodium carbonate is carried out conveniently at a temperature between about 180° C. and 220° C. Even lower temperatures can be used by increasing the amount of water in the initial mixture. The rotary steam tube calciner is a particularly useful piece of equipment in which to carry out this reaction when high pressure steam is available. In its absence, a high boiling liquid heat transfer fluid such as the well-known Dowtherms can be used in place of high pressure steam. Other equipment can also be employed provided the intimate mixture of $Na_2S$ and $NaHCO_3$ is heated to the reaction temperature under substantially muffle conditions. A multiple hearth muffle furnace can be used as well as an indirectly heated rotary kiln.

One of the factors which influence the economics of this invention is the amount of energy required to recover a pound of $H_2S$. This item is strongly influenced by the moisture content of the mixture of $Na_2S$ and $NaHCO_3$ which is heated to evolve $H_2S$. The higher the moisture content, the lower the temperature to which the mixture has to be heated. In most instances the moisture content is controlled so that two to three pounds of water are vaporized per pound of $H_2S$ evolved although under some circumstances it is advantages to vaporize three times this quantity. If it is convenient to heat the mixture above 200° C., good conversions are obtained when somewhat less water is present in the initial mixture.

In summary, then, this invention provides an improved process for the recovery of the sulfur values from an $SO_2$-containing flue gas while simultaneously purifying it so that it may be exhausted to the atmosphere as a substantially clean and harmless effluent. Variations can be employed with respect to procedures and proportions without changing the scope of the invention as defined by the following claims.

What is claimed is:

1. A system for removing the sulfur dioxide contained in a flue gas and for recovery of hydrogen sulfide comprising:

(a) a gas contacting device for contacting said flue gas with an aqueous, alkaline, sodium-carbonate containing reaction medium essentially saturated with sodium sulfite to react the bulk of the sulfur dioxide and a portion of the oxygen with the carbonate values to form a slurry of sodium sulfite and sodium sulfate dispersed in the reaction medium, the sodium and alkalinity being supplied to said reaction medium by the addition of recycled solid sodium carbonate, said gas contacting device having inlet means for receiving said flue gas and for receiving said reaction medium, and outlet means for discharging the gas and for discharging the reaction medium;

(b) a first separating means for separating sodium sulfite and sodium sulfate crystals from the reaction medium, said separating means having an inlet and an outlet;

(b') first conveying means for conveying the reaction medium from the outlet of said gas contacting device to the inlet of said first separating means;

(c) a reducing means for reducing the separated sodium sulfite and sodium sulfate crystals to solid sodium sulfide, said reducing means having an inlet and an outlet;

(c') second conveying means for conveying the separated crystals from the outlet of said first separating means to the inlet of said reducing means;

(d) a forming means for forming an intimate blend of said solid sodium sulfide with solid sodium bicarbonate, said forming means having an inlet and an outlet;

(d') third conveying means for conveying the solid sodium sulfide from the outlet of said reducing means to the inlet of said forming means;

(e) a heating means for heating said blend in the substantial absence of air to a temperature at which sodium bicarbonate would be converted to sodium carbonate and carbon dioxide to form gaseous hydrogen sulfide and dry, solid, anhydrous sodium carbonate, said heating means having an inlet and an outlet;

(e') fourth conveying means for conveying said blend from the outlet of said forming means to the inlet of said heating means;

(f) a recovering means for recovering the gaseous hydrogen sulfide, said recovering means having an inlet;

(f') fifth conveying means for conveying gaseous hydrogen sulfide from the outlet of said heating means to the inlet of said recovering means;

(g) an adding means for adding at least a portion of the sodium carbonate formed by said heating means to a sodium bicarbonate saturated solution for carbonating with carbon dioxide to form a slurry composed of solid particles of sodium bicarbonate disposed in said solution, said adding means having an inlet and an outlet;

(g') sixth conveying means for conveying said portion of the sodium carbonate from the outlet of said heating means to the inlet of said adding means;

(h) a second separating means for separating particles of sodium bicarbonate from the slurry formed by said adding means, said second separating means having an inlet and an outlet;

(h') seventh conveying means for conveying the slurry from the outlet of said adding means to the inlet of said second separating means; and (h") eighth conveying means for conveying the separated particles from the outlet of said second separating means to the inlet of said forming means.

2. The system of claim 1 wherein said gas contacting device is a scrubber.

3. The system of claim 1 wherein said first separating means is a settler and centrifuge.

4. The system of claim 1 wherein said reducing means is a direct fired rotary kiln.

5. The system of claim 1 wherein said forming means is a mixer-grinder.

6. The system of claim 1 wherein said heating means is a steam tube rotary calciner.

7. The system of claim 1 wherein said adding mean is an absorber.

8. The system of claim 1 wherein said second separating means is a settler and centrifuge.

* * * * *

UNITED STATES PATENT AND TRADEMARK OFFICE
CERTIFICATE OF CORRECTION

PATENT NO. : 4,255,388
DATED : March 10, 1981
INVENTOR(S) : Ralph Miller

It is certified that error appears in the above-identified patent and that said Letters Patent are hereby corrected as shown below:

Column 3, line 67, change "$2Na_2COnhd_3$" to $--2Na_2CO_3--$

Column 5, line 40, change "solid sulfite" to

--solid sodium sulfite--

Column 6, line 36, change "fed" to

--feed--

Signed and Sealed this

Nineteenth Day of May 1981

[SEAL]

Attest:

RENE D. TEGTMEYER

Attesting Officer

Acting Commissioner of Patents and Trademarks